United States Patent [19]

Kinemura

[11] 3,783,988

[45] Jan. 8, 1974

[54] AUTOMATIC POWER SUPPLY CONTROL APPARATUS FOR FLAT RATE ELECTRIC SERVICE SYSTEMS

[75] Inventor: Masao Kinemura, Matsue City, Japan

[73] Assignee: Koshei Arita, Minamimagome, Ohota-ku, Tokyo, Japan; a part interest

[22] Filed: June 20, 1972

[21] Appl. No.: 264,491

[30] Foreign Application Priority Data

June 26, 1971 Japan ....... 46/55600 (utility model)

[52] U.S. Cl. .................................................. 194/11

[51] Int. Cl. .......................................... G07f 15/10

[58] Field of Search ....................... 194/4, 11, 12, 9

[56] References Cited

UNITED STATES PATENTS 2,139,523 12/1938 Smith ............................... 194/11 X 2,150,324 3/1939 Grunbaum ....................... 194/11 X

*Primary Examiner*—Stanley H. Tollberg

*Attorney*—Chittick, Thompson & Pfund

[57] ABSTRACT

The customers of a service system purchase prescribed coins having a predetermined effective period from dealers of the service system and insert the coins in the apparatus installed in their houses. The automatic power supply control apparatus comprises a detector which functions to discriminate whether a coin inserted into the apparatus is a prescribed one or not for generating a detection signal only when the coin is a prescribed one, a time switch for generating a first signal upon termination of the effective period of the prescribed coin, switching means connected between a source of service and utilization apparatus enjoying the service, and a control member responsive to the detection signal from the detector and to the first signal from the time switch for controlling the switching means.

3 Claims, 3 Drawing Figures

AUTOMATIC POWER SUPPLY CONTROL APPARATUS FOR FLAT RATE ELECTRIC SERVICE SYSTEMS

BACKGROUND OF THE INVENTION

This invention relates to automatic power supply control apparatus for flat rate electric service systems such as wired television broadcasting systems and wired telephone system.

In an ordinary flat rate electric service system such as a wired television broadcasting system, the service rate is generally determined at a definite value irrespective of the content of the service, that is service hours or electric quantity supplied. Generally, the rate is calculated on the basis of prescribed number of days, for example a week or a month. To collect the service rate in such a flat rate service system, it has required many service men and hence a large expense. More particularly, substantial expense was incured in a series of operations including calculation of the rates per month, preparation of the debit notes and collection of the rates by making a round of calls of respective customers. This involves a number of problems such as shortage of workers, low efficiency of the rate collection or troubles between service men and the customers.

SUMMARY OF THE INVENTION

It is, therefore, the principal object of this invention to provide improved automatic power supply control apparatus for flat rate electric service systems which can rationalize the rate collection operation described above.

A further object of this invention is to provide novel automatic power supply control apparatus for flat rate electric service systems in which the customer buys special coins sold by prescribed dealers and inserts the coin in the control apparatus embodying the invention and installed at the house of each customer whereby to selectively enjoy services of desired service companies for desired intervals.

Still further object of this invention is to provide novel automatic power supply control apparatus for flat rate electric service systems wherein the collecting operation of the service rate can be completed when the customer inserts the special coin described above in the novel control apparatus installed in the customers house.

Another object of this invention is to provide novel automatic power supply control apparatus whereby when the service is interrupted owing to an interruption of power supply, for example, the service circuit is automatically interrupted on the side of the customer so that the customer is required to pay a service rate reasonably calculated for the quantity of service actually enjoyed.

Still another object of this invention is to provide novel automatic power supply control apparatus for flat rate electric service systems wherein the supply of the service is automatically interrupted in case where the special coin is not used, or the effective period thereof has been expired or a counterfeited coin or a coin different from the special coin is inserted in the apparatus or when collection of the service rate becomes impossible due to a fault of the control apparatus.

Yet another object of this invention is to provide novel automatic power supply control apparatus for flat rate electric service systems wherein an alarm signal is generated shortly before the effective period of the inserted special coin terminates thus requesting the customer to insert a new coin to continue the service.

According to this invention there is provided automatic power supply control apparatus for a flat rate electric service system comprising a detector which functions to descriminate whether a coin inserted in the apparatus is a prescribed one or not for generating a detection signal only when the coin is the prescribed one, a time switch for generating a first signal upon termination of the effective period of the prescribed coin, switching means connected between a source of service and utilization apparatus enjoining the service, and a control member responsive to the detection signal from the detector and to the first signal from the time switch for controlling the switching means.

The customers of the service system purchase the prescribed coins from dealers thereof and insert the coins into the automatic power supply control apparatus of this invention which are installed in their houses. The coins are constructed such that they establish electrical connections between a source of service and their utilization apparatus enjoining the service for a predetermined number of days. After expiration of a predetermined effective period of the coin the apparatus interrupts the electrical connection thereby interrupting the service. Once used, the coins are discarded. Accordingly, the service company can readily collect the service rate through the dealers just like the sale of ordinary merchandise. Accordingly, it is not necessary to collect the service rates from door to door, thus greatly simplifying the collection of the service rates which can be reflected to the customers in the form of decreasing the service rate.

Where the invention is applied to a wired television broadcasting system wherein a plurality of service of different frequencies are available the customers can select any desired service by using coins prescribed for that service. This enhances free competition among service companies which in turn improves the content of the service.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
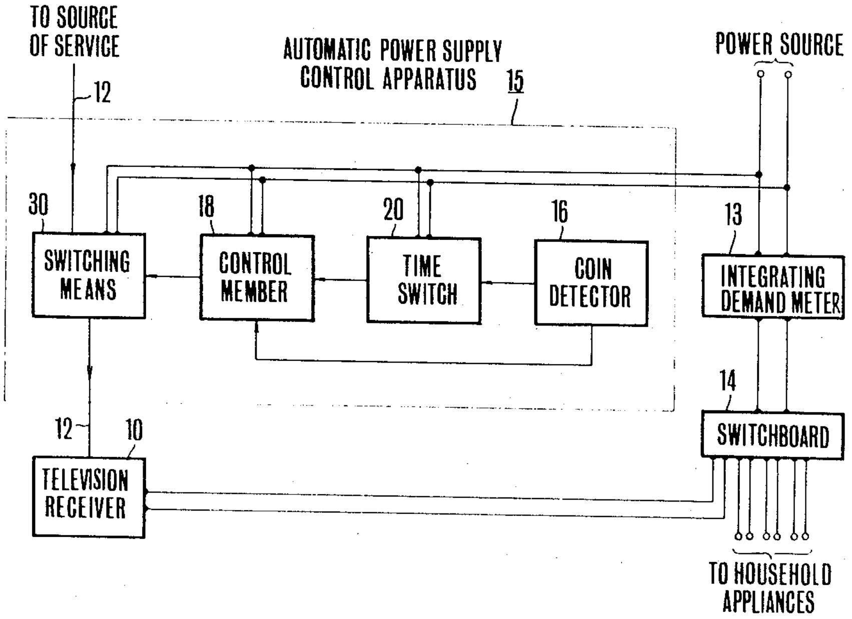
FIG. 1 shows a block diagram of one embodiment of the invention.

FIG. 1 shows an application of the invention for a flat rate service system of a wired television broadcasting system. In this figure, a television receiver designated by a reference numeral 10 is connected to a coaxial cable 12 of the wired television broadcasting system through switching means 30 to be described later in detail and also to a power source of a commercial frequency through a switch board 14 installed in a house of a customer. It is to be understood that other household appliances are also connected to the switch board 14 and the electric power consumed thereby is metered by an integrating demand meter 13.

The customer contracted with a service company is obliged to purchase special coins of the company through dealers thereof for inserting such coins into the automatic power supply control apparatus generally shown in a dot and dash block 15 shown in FIG. 1 and installed at each customer. The apparatus 15 comprises a coin detector 16, a control member 18, a time switch 20 and switching means 30 respectively energized by the power source. Detector 16 is constructed to discriminate whether the coin inserted is a genuine one or a counterfeited one or a coin sold by other companies so as to reject false or incorrect coins. When a prescribed special coin is inserted detector 16 operates to supply electrical signals to control member 18 as well as to time switch 20 thereby operating the same.

Figure 2:
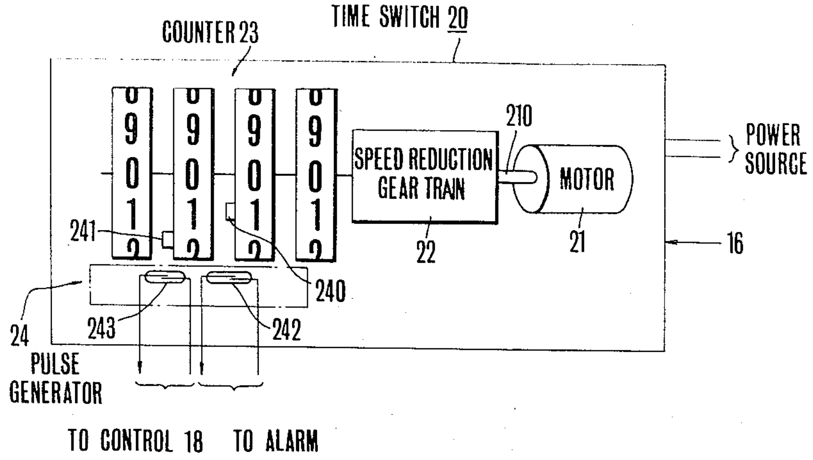
FIG. 2 is a diagrammatic representation of a number of days integrating type time switch employed in this invention.

As is diagrammatically shown in FIG. 2, time switch 20 comprises a synchronous motor 21, a speed reduction gear train 22 connected to the output shaft 210 of synchronous motor 21 and a mechanical counter 23 including a plurality of digit wheels driven by the speed reduction gear train 22. Upon rotation of motor 21 the digit wheels are rotated to display the number of days serviced.

Associated with counter 23 is a pulse generator 24 which is constructed to generate a pulse when a preset number of days is integrated. In the illustrated embodiment, permanent magnets 240 and 241 are mounted respectively on digit wheels 232 and 233 of the tenth and hundreds orders so as to operate reed switches 242 and 243, respectively. For example, the counter 23 is constructed to operate reed switches 242 and 243 when it counts 90 days and 100 days respectively, thus generating signals as will be described later.

As above described, it is advantageous to construct pulse generator 24 of time switch 20 such that it generates two types of signals. More particularly, one signal is used to indicate the termination of the effective period of the special coin inserted whereas the other is used to generate an alarm signal indicating that the effective period will soon be terminated. With reference to the example assumed above, when the counter 23 counts 90 days, an alarm signal is generated indicating that the effective period will soon be terminated and when 100 days are counted a termination signal is generated indicating that the effective period of the coin inserted has just terminated.

Signals generated by counter 23 of time switch 20 are sent to control member 18. In this manner, control member 18 is supplied with the signal generated by detector 16 when it detects a genuine coin, the alarm signal and the termination signal from counter 23. In response to these signals control member 18 operates switching means 30 so as to connect or disconnect the television receiver 10 to and from coaxial cable 12 of the wired television broadcasting service system.

Figure 3:
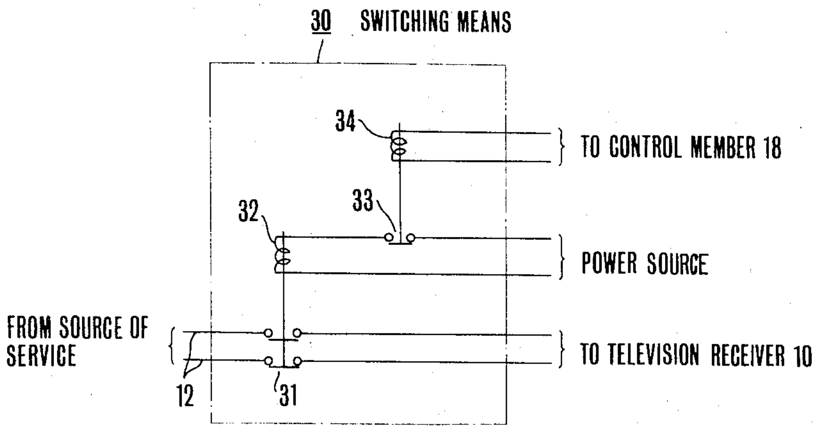
FIG. 3 is a connection diagram showing one example of switching means employed in this invention.

As shown in FIG. 3, switching means 30 comprises a switch 31 connected between the input and output sides of the coaxial cable 12 for transmitting the electric wave, a relay 34 connected to the control member 18 described above and an AC relay 32 connected to the power source of the commercial frequency through the normally closed contact 33 of relay 34 for controlling the switch 31. As shown, relay 32 is normally energized from the source to maintain switch 31 in the closed state. Accordingly, when the supply of the power is interrupted, relay 32 is deenergized to open switch 31 thus interrupting the supply of the electric wave.

Relay 34 connected to control member 18 is reset to close its contact 33 when control member 18 receives a signal indicating the detection of a special coin from detector 16, whereas in the absence of the detection signal, that is in the absence of the special coin and when a termination signal is sent when the time switch 20 counts a predetermined number of days upon termination of the effective period of the coin inserted, relay 34 is operated by the control member 18 to open its contact 33. As a result, relay 32 is deenergized to open switch 31 thus interrupting the transmission of the electric wave to the television receiver 10.

Although the above embodiment illustrates the application of the invention to a wired television broadcasting system, it should be understood that the invention is not limited to this particular application, but can equally be applied to similar electrical services such as wired telephone systems or flat rate power supply systems or the like wherein the service rate is predetermined for a predetermined period or number of days irrespective of the amount of service enjoyed during the period. Further it should be understood that many changes and modifications will be obvious to one skilled in the art without departing from the true spirit and scope of the invention as defined in the appended claims.

What is claimed is:

1. Automatic power supply control apparatus for a flat rate electric service system comprising a detector which functions to discriminate whether a coin inserted in the apparatus is a prescribed one or not for generating a detection signal only when said coin is the prescribed one, a time switch controlled by said detector for generating a first signal upon termination of the effective period of said prescribed coin, switching means connected between a source of service and utilization apparatus enjoying the service, and a control member responsive to said detection signal from said detector and to said first signal from said time switch for controlling said switching means wherein said switching means comprises a switch connected between said source of service and said utilization apparatus, an AC relay connected across a power source of a commercial frequency for normally holding said switch in the closed state, whereas opening said switch upon interruption of said power source, a normally closed contact connected in series with said AC relay, and a relay connected to said control member such that said relay operates only when no detection signal is received from said detector or when it receives a termination signal from said time switch upon termination of the effective period of said prescribed coin inserted thereby opening said switch.

2. Automatic power supply control apparatus for a flat rate electric service system comprising a detector which functions to discriminate whether a coin inserted in the apparatus is a prescribed one or not for generating a detection signal only when said coin is the prescribed one, a time switch controlled by said detector for generating a first signal upon termination of the effective period of said prescribed coin, switching means connected between said source of service and utilization apparatus enjoying the service, and a control member responsive to said detection signal from said detector and to said first signal from said time switch for controlling said switching means wherein said time switch comprises a mechanical counter driven at a constant speed and a pulse generator associated with said mechanical counter, said mechanical counter including a plurality of integrating wheels which act to integrate the number of days after insertion of said prescribed coin and a permanent magnet mounted on one of said integrating wheels at a position corresponding to a predetermined number of days and said pulse generator including a reed switch operated by said permanent magnet.

3. The apparatus according to claim 2 wherein two permanent magnets are mounted on said integrating wheels at points corresponding to the termination of the effective period of said prescribed coin and to a predetermined number of days shortly before said termination of the effective date, respectively.

* * * * *